United States Patent [19]

Williams

[11] Patent Number: 4,727,508

[45] Date of Patent: Feb. 23, 1988

[54] CIRCUIT FOR ADDING AND/OR SUBTRACTING NUMBERS IN LOGARITHMIC REPRESENTATION

[75] Inventor: Tim A. Williams, Austin, Tex.

[73] Assignee: Motorola, Inc., Schaumburg, Ill.

[21] Appl. No.: 681,454

[22] Filed: Dec. 14, 1984

[51] Int. Cl.$^4$ .......................... G06F 7/556; G05F 7/50
[52] U.S. Cl. ..................................... 364/768; 364/715
[58] Field of Search ............... 364/768, 786, 736, 780, 364/783, 754, 728, 764

[56] References Cited

U.S. PATENT DOCUMENTS 4,531,124  7/1985  Lassallette et al. .................. 364/768
4,555,768  11/1985  Lewis, Jr. et al. .................... 364/757

FOREIGN PATENT DOCUMENTS 3326044  2/1985  Fed. Rep. of Germany ...... 364/754
5572252  5/1980  Japan .................................... 364/768

OTHER PUBLICATIONS

Hall et al, "Generation of Products and Quotients Using Approximate Binary Logarithms for Digital Filtering Applications", IEEE Trans. on Comp., 2/1970, pp. 97-105.
Kingsbury et al., "Digital Filtering Using Logarithmic Arithmetic", Electronics Letters, vol. 7, No. 2, Jan. 28, 1971, pp. 56-58.
Mitchell, Jr., "Computer Multiplication and Division Using Binary Logarithms", IRE Trans. on Electronic Computers, Aug. 1962, pp. 512-517.
Brubaker et al., "Multiplication Using Logarithms Implemented With Read-Only Memory", IEEE Trans. on Comp., vol. c-24, No. 8, Aug. 1975, pp. 761-765.
Lang et al., "*Integrated-Circuit Logarithmic Arithmetic Units*", IEEE Trans. on Computers, vol. c-34, No. 5, 5/1985, pp. 475-483.

Primary Examiner—Gary V. Harkcom
Assistant Examiner—Tan V. Mai
Attorney, Agent, or Firm—John A. Fisher; Jeffrey Van Myers; Robert L. King

[57] ABSTRACT

In a digital signal processing system, a logarithmic arithmetic logic unit which selectively performs multiply/accumulate operations of operands in logarithmic number representation. Direct feed through of operands through an adder/subtractor circuit, even when an addition or subtraction is not effected, eliminates external bypass circuitry. A method for adding and subtracting operands in logarithmic number representation. An adder/subtractor circuit which efficiently effects addition and subtraction of operands in logarithmic number representation over a wide dynamic range.

11 Claims, 9 Drawing Figures

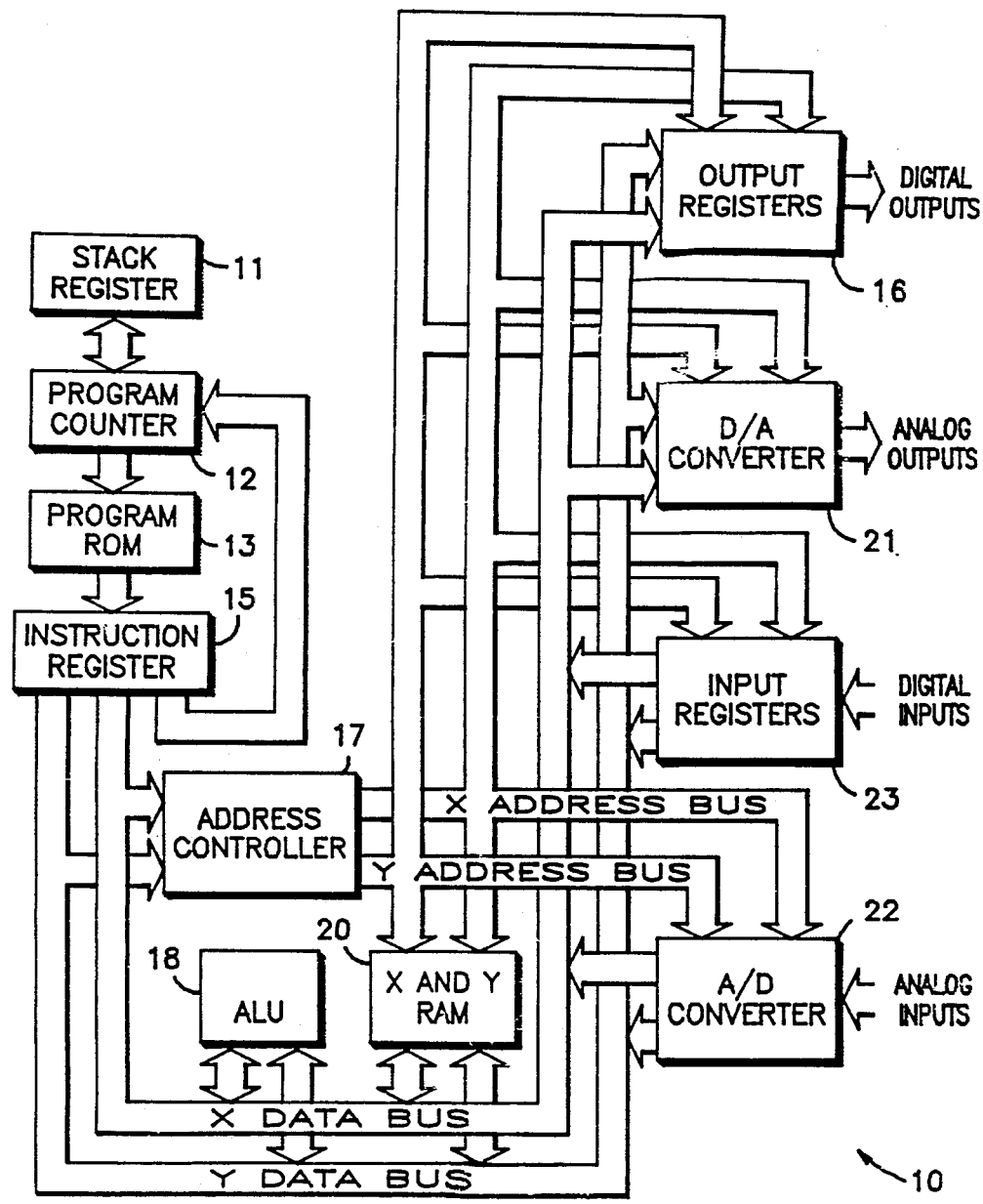
FIG. 1   - PRIOR ART -

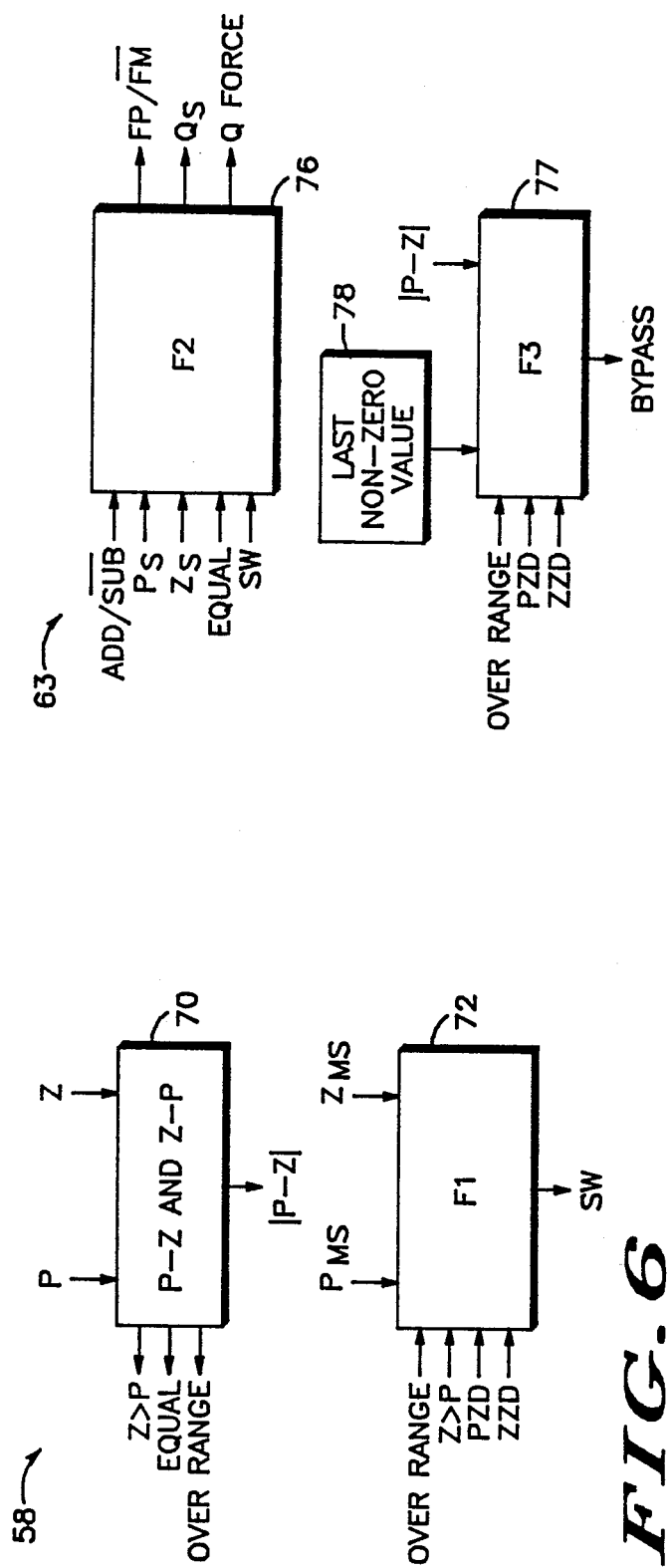
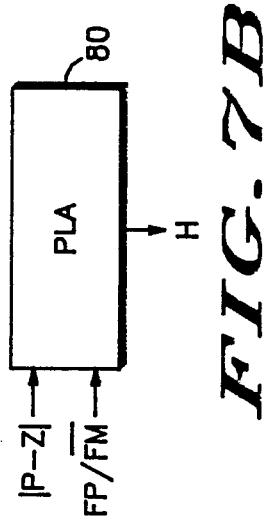
FIG. 7A
FIG. 7B
FIG. 6

CIRCUIT FOR ADDING AND/OR SUBTRACTING NUMBERS IN LOGARITHMIC REPRESENTATION

Cross Reference to Related Applications

1. Application Ser. No. 06/681,453, entitled "A LOGARITHMIC ARITHMETIC LOGIC UNIT", filed simultaneously herewith by Tim A. Williams, now U.S. Pat. No. 4,682,302.

2. Application Ser. No.06/681,455, entitled "A METHOD OF ADDING AND/OR SUBTRACTING NUMBERS IN LOGARITHMIC REPRESENTATION", filed simultaneously herewith by Tim A. Williams abandoned.

TECHNICAL FIELD

This invention relates to signal processors, and more particularly, to a logarithmic adder and subtractor circuit for use in a digital signal processing system.

BACKGROUND OF THE INVENTION

Digital signal processors have previously selectively utilized both linear and logarithmic number representations in an effort to perform signal processing as fast and efficiently as possible. For example, finite impulse response (FIR) filters have been implemented by using logarithms to perform multiplication and division operations which can be readily accomplished by only adding and subtracting, respectively, numbers in logarithmic representation. However, addition and subtraction operations are much more complicated to perform in a logarithmic system rather than in a linear number system. Therefore, others have typically converted from logarithmic to linear to perform addition and then, if necessary, back to a logarithmic number representation to accomplish a multiplication or division operation. By effecting numerous conversions of number systems, the inherent advantages of the logarithmic number representation with respect to multiplication and division operations are typically lost.

A use of logarithmic signal processing includes a logarithmic multiplier and a logarithmic adder which utilize a bypass bus to bypass the adder when an input operand is zero. Because the number zero is not representable by logarithms and must be represented by a predetermined quantized minimum value, a bypass path typically couples the nonzero adder input operand directly from an adder input to an output thereof. Otherwise, the adder circuit will add the nonzero operand with a quantized minimum value to provide an output having a quantization error. A problem with such a logarithmic multiplier/adder is that the bypass path creates an additional bus which adds size and complexity to the general circuitry. Circuits which perform repetitive accumulations or multiply/accumulation operations generate operands having a bit size greater than the bit size of the operands. Typical processors do not have the ability to effect repetitive operations without losing extra bits provided by each calculation during a repetitive operation. Further, previous logarithmic adders and subtractors have typically used a look-up table containing a complete table of logarithmic values which function in a manner analogous to manually locating a linear value corresponding to a logarithmic value and adding or subtracting the linear values. Such look-up tables require very large ROMs to implement a complete table of logarithms and antilogarithms.

SUMMARY OF THE INVENTION

Accordingly, an object of the present invention is to provide an improved circuit for adding and subtracting numbers in logarithmic representation.

Another object of the present invention is to provide an improved adder/subtractor circuit for efficiently adding and subtracting numbers in logarithmic representation.

Yet another object of the present invention is to provide an improved adder/subtractor circuit which minimizes quantization error associated with logarithmic representations.

In carrying out the above and other objects of the present invention there is provided, in one form, a circuit for adding or subtracting, in response to an arithmetic operation control signal, two numbers in a logarithmic number representation. First means are provided for selectively receiving the two numbers and providing an absolute value of the difference of the numbers. The first means also provide a first control signal indicating which one of the numbers has a greater real value and a second control signal indicating if both numbers are equal. Second means are coupled to the first means for receiving the absolute value of the difference and selectively providing a predetermined correction factor in response to the absolute value of the difference and otherwise providing a bypass control signal. Third means are provided which have a first input coupled to the second means for selectively receiving the correction factor in response to the bypass control signal and a second input for selectively receiving, in response to the first control signal, the number of the two numbers having the greater real value. The third means selectively provide an output in logarithmic representation which is either the sum or the difference of said two numbers or directly output only the greatest real valued number as the sum or difference, in response to the bypass control signal.

BRIEF DESCRIPTION OF THE DRAWINGS

FIG. 1 illustrates in block diagram form a signal processor known in the art for use with the present invention;

FIG. 6 illustrates in block diagram form a function logic circuit for use in the subtractor/adder circuit of FIG. 5; and FIGS. 7(a) and 7(b) illustrate in block diagram form a programmable logic array for use in the subtractor/adder circuit of FIG. 5.

DETAILED DESCRIPTION OF THE PRESENT INVENTION

Figure 2A:
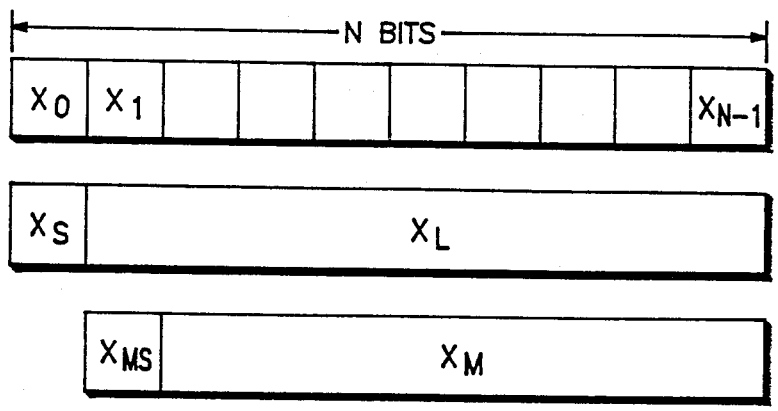
FIG. 2(a) illustrates in block diagram form a logarithmic number representation for use with the present invention.

Shown in FIG. 1 is a signal processor 10 for implementing a plurality of algorithms commonly used in digital signal processing applications. A stack register 11 is coupled to a program counter 12 for transfer of data between program counter 12 and stack register 11. An output of program counter 12 is coupled to an input of a program ROM 13 having an output thereof coupled to an input of an instruction register 15. A first output of instruction register 15 is coupled to a first data bus labeled "X Data Bus". The X data bus is coupled to a first input of a plurality of output registers 16 and to a first input of an address controller 17. An arithmetic logic unit (ALU) 18 and a random access memory circuit 20 each has first terminals coupled to the X data bus. The X data bus is also coupled to a second input of a digital to analog converter 21, to a second output of a plurality of input registers 23 and to a second output of an analog to digital converter 22. A second output of instruction register circuit 15 is coupled to a second data bus labeled "Y Data Bus", and a third output of instruction register circuit 15 is coupled to a control terminal of program counter 12. The Y data bus is coupled to a second input of address controller 17, to a second terminal of ALU 18, to a second terminal of memory circuit 20, to a second input of the plurality of output registers 16, to a first input of digital to analog converter 21, to a first output of analog to digital converter 22 and to a first output of the plurality of input registers 23. Address controller 17 has a first output coupled to a first address bus labeled "X Address Bus" and a second output coupled to a second address bus labeled "Y Address Bus". The X address bus is coupled to a third input of output registers 16, to a third input of digital to analog converter 21, to a first input of the input registers 23, to a first input of analog to digital converter 22 and to a third input of memory circuit 20. Similarly, the Y address bus is coupled to a fourth input of output registers 16, to a fourth input of digital to analog converter 21, to a second input of analog to digital converter 22, to a second input of input registers 23 and to a fourth input of random access memory circuit 20. Analog to digital converter 22 receives a plurality of analog input signals at a third input thereof, and digital to analog converter 21 provides a plurality of analog output signals at an output thereof. A plurality of digital inputs are coupled to a third input of input registers 23, and output registers 16 provide a plurality of digital outputs at an output thereof.

In the illustrated form, signal processor 10 is a common example of a processor having a two bus architecture controlled by a simplified microcode instruction. Program counter 12 and instruction register 15 are capable of retrieving data from program ROM 13 and outputting that data onto the X and/or Y data bus. Program counter 12 generates an address of data to be retrieved from program ROM 13. An instruction which is to be executed by processor 10 is provided by program ROM 13 in microcode form. Specific predetermined fields within the instruction specify to other portions of processor 10 predetermined tasks for implementing a predetermined algorithm. Address controller 17 functions in conjunction with program ROM 13 to provide appropriate addresses to the X and Y RAM 20, to A/D converter 22, to input registers 23, to D/A converter 21 and to output registers 16 to perform data movement. For example, an instruction provided by program ROM 13 may require ALU 18 to multiply two numbers which are addressed by address controller 17 from memory circuit 20. Or the instruction field may require analog to digital converter 22 to directly output received analog inputs as digital outputs via output registers 16. It should be readily apparent that a plurality of data manipulations may be performed by processor 10 and selectively stored or outputted. The processor architecture of FIG. 1 is provided only to illustrate a typical use of the present invention. The present invention may be used with numerous other processor architectures.

Historically, as digital signal processing (DSP) has evolved, most electronic implementations in DSP have utilized a linear number system having either fixed-point or floating point number sytems. However, significant practical advantages associated with die size and error growth exist when logarithmic arithmetic units are used. Circuit size is minimized by logarithmic arithmetic units due to the fact that logarithmic arithmetic units permit data compression and shorter data representations. Further, speed is not reduced on a per bit basis as compared with fixed-point numbers when logarithmic arithmetic units are used. Error growth due to quantization during signal processing which is measured by a loss of significant bits is less severe in logarithmic arithmetic units. This means that the same amount of precision may be obtained with fewer bits in logarithmic arithmetic units rather than in fixed point arithmetic units.

In operation, if a processor such as processor 10 of FIG. 1 utilizes logarithmic arithmetic units, a conversion from linear arithmetic units to logarithmic arithmetic units must be effected. Therefore, in addition to an analog to digital converter, a linear to logarithmic converter must be added to processor 10. After such a conversion is effected, all arithmetic computations are performed as logarithmic number representations. Similarly, before the processed numbers are outputted by processor 10, a conversion back to a linear arithmetic representation must be made by using a conventional logarithmic to linear converter.

An illustration of a logarithmic number representation is provided in FIG. 2(a). An entire number is shown containing N bits beginning with bit $X_0$ and ending with bit $X_{N-1}$. The logarithmic representation of the number shown in FIG. 2(a) and denoted as "X" is:

$$X = \text{signum } (X') \log_D |X'|$$

where D represents the base of the number system, the "prime" symbol represents the real number system, and "signum" represents the sign of the function. The first bit $X_0$ is a sign bit, $X_S$, and the remaining bits are represented as $X_L$ as shown by the second representation of the N bit number in FIG. 2(a). The sign bit $X_S$ is zero if the value of X' is positive and is one if the value of X' is negative. This number representation is a sign magnitude representation. In a preferred form, the bits comprising $X_L$ represent a two's complement number. The second bit $X_1$, labeled $X_{MS}$, represents the sign of the number $X_L$ as shown by the last detailed representation of the N bit number in FIG. 2(a). The remaining bits of $X_L$ are represented as $X_M$ and theoretically contain an integer portion and a fractional portion.

Figure 2B:
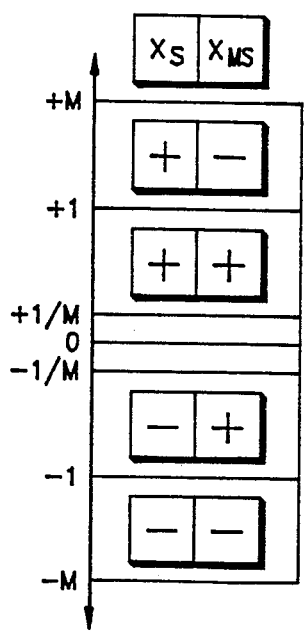
FIG. 2(b) illustrates in graphical form a range of numbers represented by the number representation of FIG. 2(a)

Shown in FIG. 2(b) is an example of the range of real numbers which may be represented by the number system of FIG. 2(a). For all numbers greater than +1 or less than −1, $X_{MS}$ is negative. For all numbers falling within either the range of +(1/M) to +1 or the range of −(1/M) to −1, $X_{MS}$ is positive. The largest real number which can be represented by $X_M$ is $2^{(N-2)} - 1$ or B. The largest real number which can be represented by $X_L$ is $D^{-B}$ which is equal to M. The smallest real number which can be represented by $X_L$ is $+D^{+(B)}$ which is equal to (1/M). Therefore, $X_L$ has a range of values between +M and (1/M). The base of the number system, D, is defined to always be less than one. Upon reviewing FIG. 2 (a), it should be apparent why two separate sign bits are needed in this number represenation. The first sign bit $X_S$ extends the representable range of numbers not only to positive real values but also to negative real values. The second sign bit $X_{MS}$ provides the ability to distinguish between numbers above or below +1 or −1. If all bits which comprise $X_L$ have a value of zero, the real number represented is 1. As $X_L$ increases in the positive direction, the real value number represented decreases toward zero. Similarly, as $X_L$ increases in the negative direction, the real value number represented increases toward +M.

A primary advantage of the logarithmic number system described above is the ease in which multiplication and division arithmetic operations may be effected. As in any logarithmic number system, a multiplication operation may be readily performed by effecting an addition of the multiplier and multiplicand. Similarly, a division operation may be performed by effecting a subtraction of the dividend from the divisor. Such an addition or subtraction may be readily performed by a small amount of circuitry. A sign value determination of the resulting product or quotient may also be readily found by a simple logic circuit which compares the value of the signs of the operands.

To perform an addition or subtraction in a logarithmic number system is somewhat more difficult to implement than multiplication and division. However, the process of converting from a logarithmic to a linear system for the purpose of addition and subtraction operations is even more cumbersome than performing the addition and subtraction in the logarithmic system. Therefore, a discussion of the steps required to effect an addition and a subtraction arithmetic operation via logarithms will be discussed. Shown in Appendix One is a set of exponential equations derived from the addition of two linear numbers P′ and Z′ to provide a sum Q′ Equations 2 thru 9 define the linear/logarithmic relationship associated with addends P′ and Z′ and sum Q′. For example, equation 2 expresses the logarithmic value $P_L$ as a log to the base D of the absolute value of the magnitude of linear number P′. Equations 2–9 define the sign and magnitude logarithmic representations of P′, Z′ and Q′. Equation 10 is a restatement of equation 1 in terms of sign and magnitude representations. Substituting previously defined values, equation 11 provides the logarithmic relationship of the sum of linear numbers P′ and Z′. The resulting logarithmic sum depends upon four possible relationships of $P_S$ and $Z_S$. In the first possibility, assume that the sign of numbers P and Z are equal, whether both are positive or both are negative. Therefore, the sign of the resulting sum will be the same as the sign of linear number P′ (equation 13). Equation 15 defines the logarithmic sum $Q_L$ in terms of the logarithm of the linear numbers P′ and Z′. The value of the logarithmic sum depends upon the relative magnitudes of logarithmic values $P_L$ and $Z_L$. If the value of $D^{P_L}$ is greater than the value of $D^{Z_L}$, the logarithmic sum, $Q_L$, is defined by equation 18. However, if the maximum value of $Z_L$ is greater than the maximum value of $P_L$, the logarithmic sum $Q_L$ is defined by equation 21.

The second possible relationship of $P_S$ and $Z_S$ is the case where the sign of P is positive and the sign of Z is negative. In this situation, the sign of the sum depends upon the relationship of the values of $P_L$ and $Z_L$ as shown by equations 24 and 28. When the real value represented by addend $P_L$ is greater than the real value represented by addend $Z_L$, the value of the logarithmic sum is expressed by equation 27. However, when the real value represented by addend $Z_L$ is greater than the real value represented by addend $P_L$, the value of the logarithmic sum is expressed by equation 32. The derivation of equations 27 and 32 is illustrated in detail by the intervening equations.

The third possible relationship of $P_S$ and $Z_S$ is the case where the sign of P is negative and the sign of Z is positive. Once again, the sign of the sum depends upon the relationship of the values of $P_L$ and $Z_L$ and is stated in equations 35 and 39 for the cases when the maximum value is $P_L$ and $Z_L$, respectively. When the real value represented by addend $P_L$ is greater than the real value represented by addend $Z_L$, the value of the logarithmic sum is expressed by equation 38. However, when the real value represented by addend $Z_L$ is greater than the real value represented by addend $P_L$, the value of the logarithmic sum is expressed by equation 43. The derivation of equations 38 and 43 is also illustrated in detail by intervening equations.

The fourth possible relationship of $P_S$ and $Z_S$ is the case where the signs are opposite and the logarithmic values of the numbers P and Z are equal. When this situation occurs for an addition operation, the sum should be zero. Therefore, the value of the sign of the sum, $Q_S$, is arbitrary. However, the number zero does not exist in a logarithmic system by definition. As a result, a quantized minimum value must be substituted for zero. Equation 45 defines the minimum value as being equal to 1/M. A discussion of how to minimize errors associated with this quantization error will be provided below.

Shown in Appendix Two is an illustration of the mathematical relationships between logarithmic and linear numbers in a subtraction operation. Equation 1 illustrates the subtraction of two linear numbers P′ and Z′ to provide a linear difference Q′. Equations 2 thru 9 define the linear/logarithmic relationship associated with minuend P′, subtrahend Z′ and resultant Q′. Equation 10 is a restatement of equation 1 in terms of sign and magnitude representations. Substituting previously defined values, equation 11 provides the logarithmic relationship of the difference of linear numbers P′ and Z′. The resulting logarithmic difference also depends upon four possible relationships of $P_S$ and $Z_S$. In the first possibility, assume that the signs of the linear numbers P′ and Z′ are equal, whether both are positive or negative. If the maximum value of $P_L$ is greater than the maximum value of $Z_L$, the sign of the resulting difference will be the same as the sign of number P′ as shown in equation 13. Equations 14 thru 16 illustrate the derivation of the logarithmic value of the difference of numbers P′ and Z′ which is provided in equation 17 for the above stated conditions. If the maximum value of $P_L$ is less than the maximum value of $Z_L$, the sign of the resulting difference will be the negative of number P' as shown in equation 18. Under this condition, equations 19 and 20 illustrate the derivation of the logarithmic value of the difference of numbers P' and Z' which is provided in equation 21.

The second possible relationship of $P_S$ and $Z_S$ is the case where the sign of P is positive and the sign of Z is negative. In this situation, the sign of the difference is positive regardless which number has the greater magnitude. Equation 26 defines the value of the logarithmic difference when the maximum value of $P_L$ is greater than the maximum value of $Z_L$, and equation 30 defines the value of the logarithmic difference when the maximum value of $Z_L$ is greater than the maximum value of $P_L$. The derivation of equations 26 and 30 is shown by preceding equations in Appendix Two.

The third possible relationship of $P_S$ and $Z_S$ is the case where the sign of P is negative and the sign of Z is positive. In this situation, the sign of the difference is negative regardless which number has the greater magnitude. Equation 36 defines the value of the logarithmic difference when the maximum value of $P_L$ is greater than the maximum value of $Z_L$, and equation 40 defines the value of the logarithmic difference when the maximum value of $Z_L$ is greater than the maximum value of $P_L$. The derivation of equations 36 and 40 is also shown by preceding equations.

The fourth possible relationship of $P_S$ and $Z_S$ is the case where the signs are equal and the logarithmic values of the numbers P and Z are equal. When this situation occurs in subtraction, the difference should be zero. Therefore, the value of the sign of the resulting difference is arbitrary. However, the number zero must again be quantized and a minimum value substituted for zero. Again, the value of 1/M is chosen as the minimum value in this situation as shown by equation 42.

In theory, an addition or subtraction may be readily accomplished by obtaining the value of either $P_L$ or $Z_L$ and adding a correction factor. Furthermore, the correction factor may be easily identified depending upon the sign values as always being either $\log_D(1+D^Y)$ or $\log_D(1-D^Y)$ where Y is the magnitude of the difference between $P_L$ and $Z_L$. The present invention involves the use of a logarithmic number system where arithmetic calculations are performed by storing the derived correction factors in any of a plurality of possible ways to selectively accomplish an arithmetic operation. Use of the present invention with processor 10 of FIG. 1 requires that all analog inputs received by A/D converter 22 be converted from real values to logarithmic values by a converter (not shown) in addition to an analog to digital conversion. Another way to accomplish this conversion is to use a conventional modified codec to effect both the A/D and the linear/logarithmic conversion. To effect a conversion back to real analog units, a conversion is made by D/A converter 21 to analog units and a conversion from logarithmic values to linear values is made by a converter not shown. However, it should be readily understood that the present invention may also use conversion representations other than purely logarithmic such as the conventional. A law/Mu law logarithmic approximation code by using a conventional codec.

Figure 3:
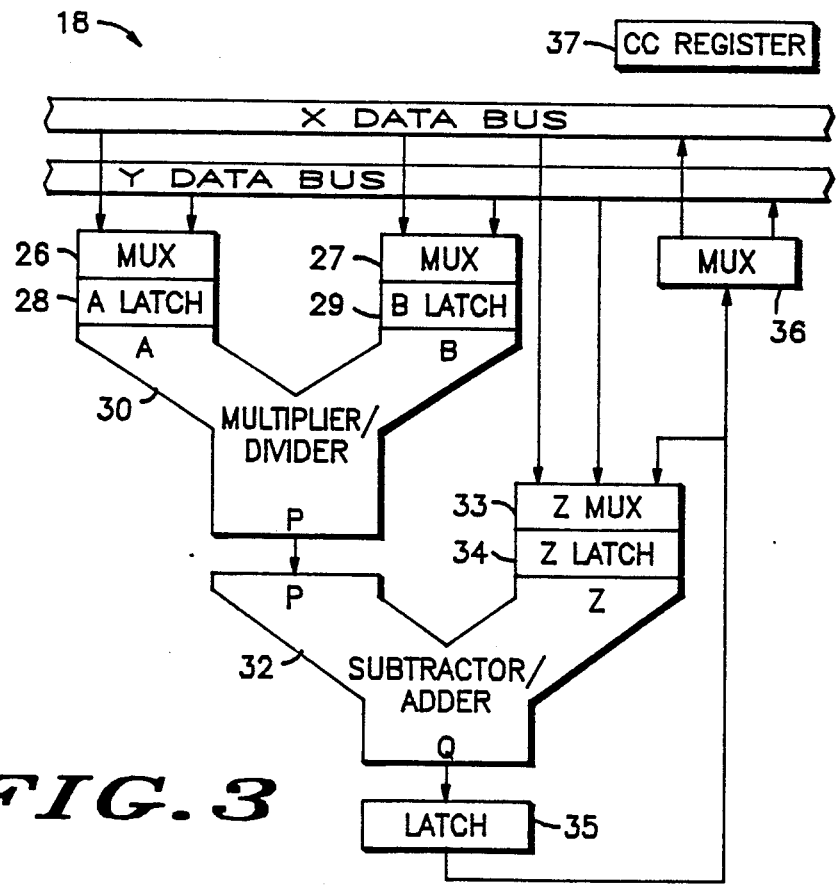
FIG. 3 illustrates in block diagram form an ALU for use in the processor of FIG. 1 in accordance with the present invention.

Shown in FIG. 3 is a detailed block diagram of ALU 18 of FIG. 1 in accordance with the present invention. The X data bus is coupled to a first input of both a multiplexer 26 and a multiplexer 27. The Y data bus is coupled to a second input of both multiplexers 26 and 27. Multiplexer 26 may selectively receive a data word from either data bus, and multiplexer 27 may selectively receive a data word from either data bus. Multiplexer 26 is coupled to a latch circuit 28 and multiplexer 27 is coupled to a latch circuit 29. An output of latch circuit 28 is coupled to an input labeled "A" of a multiplier/divider circuit 30. Similarly, an output of latch circuit 29 is coupled to an input labeled "B" of multiplier/divider circuit 30. An output of multiplier/divider circuit 30 labeled "P" is coupled to a first input of an adder/subtractor circuit 32. A multiplexer circuit 33 has a first input coupled to the X data bus and a second input coupled to the Y data bus. An output of multiplexer circuit 33 is coupled to an input of a latch circuit 34 which has an output labeled "Z" coupled to a second input of adder/subtractor circuit 32. An output of adder/subtractor circuit 32 labeled "Q" is coupled to an input of a latch circuit 35. An output of latch circuit 35 is coupled to both a third input of multiplexer circuit 33 and to an input of a multiplexer circuit 36 via an accumulation (ACC) bus. First and second outputs of multiplexer circuit 36 are coupled to the X and Y data buses, respectively. A condition code register 37 provides condition codes for ALU 18.

In operation, data is selectively coupled from the X and Y data buses to both multiplier/divider circuit 30 and to adder/subtractor circuit 32. The output of ALU 18 is denoted by a "Q" in which Q is a predetermined combination of either a multiplication or division and/or an addition or subtraction. ALU 18 is capable of performing addition, subtraction, multiplication or division of any two numbers in logarithmic representation provided via either or both of the X and Y data buses. In digital signal processing, the most common operation is a multiply/accumulate operation. Therefore, the multiply/accumulate path is the most critical in a processor structure and should therefore be streamlined to accomplish this function. Assuming, for the purpose of illustration only, that circuit 30 functions as a multiplier rather than a divider, a product, P, of numbers A and B is formed by multiplier/divider circuit 30 and the product is coupled directly to adder/subtractor circuit 32 as an addend. If the other addend is zero or if an addition or subtraction operation is not effected, adder/subtractor circuit 32 is capable of providing an output immediately without bypassing circuit 32 with external busing or circuitry. Further, if zero is actually added to form a logarithmic sum, the sum has no error associated with the fact that zero cannot be represented as a logarithmic number. Previously, others have added a minimum quantized value to a multiplier's output product and thus obtained a sum which was greater than the value of P. To avoid this error, others have used an external data bus and a multiplexer and routed a multiplier's output to the input of a latch circuit such as latch circuit 35. However, the external bus required an additional data bus and a multiplexer. In contrast, the present invention directly couples the output of multiplier/divider circuit 30 into adder/subtractor circuit 32 without using any other data busses or external switches. Further, when an addend of zero represented by number "Z" is added to the logarithmic output of multiplier/divider cirucit 30, no error is encountered due to quantization as will be explained below. Even when only a multiplication or division operation is effected, the output of multiplier/divider 30 is still coupled to an input of adder/subtractor circuit 32 which is directly fed through adder/subtractor circuit 32 to latch circuit 35. Multiplexer circuit 36 functions to provide the latched output to one or both of the X and Y data buses. Condition code register 37 functions to selectively store ALU condition signals which are provided by ALU 18 during operation. An example of some of the conditions which are provided include an adder overflow condition, an adder underflow condition and the equality of both addends. The condition signals may be used by a microcode controller (not shown) to execute conditional jumps or conditional branches.

Figure 4:
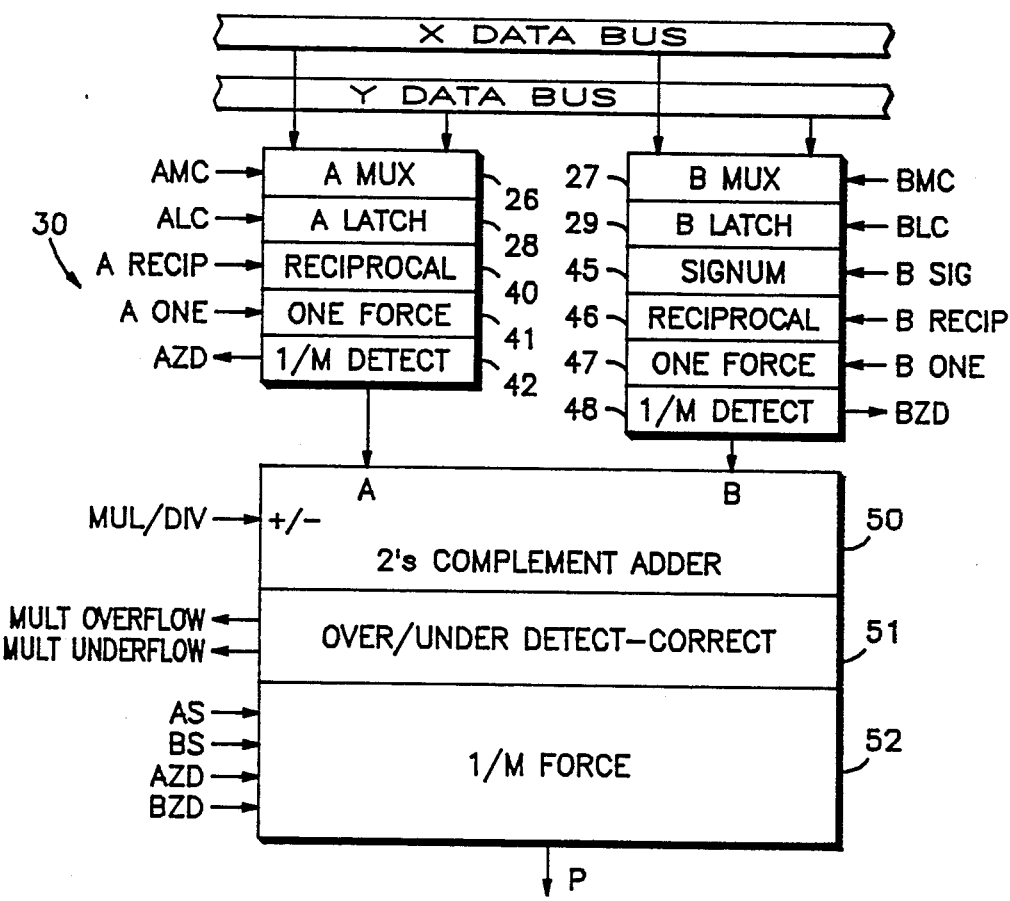
FIG. 4 illustrates in block diagram form a multiplier/divider circuit for use in the ALU of FIG. 3.

Shown in FIG. 4 is a block diagram of multiplier/divider circuit 30 of FIG. 3. Multiplexer circuits 26 and 27 both have first and second inputs coupled to the X and Y data buses, respectively, as previously described. Latch circuit 28 has an input coupled to the output of multiplexer circuit 26, and latch circuit 29 has an input coupled to the output of multiplexer circuit 27. An output of latch circuit 28 is coupled to an input of a logic circuit 40 labeled "Reciprocal". A logic circuit 41 labeled "One Force" has an input coupled to an output of circuit 40 and an output coupled to an input of a logic circuit 42 labeled "1/M Detect" which provides a zero detect status signal labeled "AZD". A first multiplexer control signal labeled "AMC" is coupled to multiplexer 26, and a second control signal labeled "BMC" is coupled to multiplexer 27. A latch control signal labeled "ALC" is coupled to latch circuit 28. A control signal labeled "A Recip" is coupled to logic circuit 40. A control signal labeled "A One" is coupled to logic circuit 41 and a control signal labeled "AZD" is coupled to logic circuit 42. An output of latch circuit 29 is coupled to an input of a sign logic circuit 45 labeled "Signum". A control signal labeled "BLC" is coupled to latch circuit 29, and a control signal labeled "B SIG" is coupled to sign logic circuit 45. An output of sign logic circuit 45 is coupled to an input of a logic circuit 46 labeled "Reciprocal" which has a control signal labeled "B Recip" coupled to a control input thereof. An output of logic circuit 46 is coupled to an input of a logic circuit 47 which has a control signal labeled "B One" coupled to a control input thereof. An output of logic circuit 47 is coupled to an input of a logic circuit 48 labeled "1/M Detect" which provides a zero detect status signal labeled "BZD". An output of logic circuit 42 is coupled to a first input of an adder circuit 50 labeled "A" and an output of logic circuit 48 is coupled to a second input of adder circuit 50 labeled "B". A multiply/divide control signal labeled "MUL/DIV" is coupled to a control input of adder circuit 50. An output of adder 50 is coupled to an input of an overflow/underflow detection and correction logic circuit 51. Logic circuit 51 provides both a multiplier overflow and a multiplier underflow status signal. An output of logic circuit 51 is coupled to an input of a zero (1/M) force logic circuit 52 which provides an output product labeled "P" at an output thereof. Sign control signals for both numbers A and B labeled "AS" and "BS", respectively, are respectively coupled to first and second control inputs of logic circuit 52. The zero detect signals "AZD" and "BZD" provided by logic circuits 42 and 48, respectively, are respectively coupled to third and fourth control inputs of logic circuit 52. Control signals AMC, BMC, ALC, BLC, A RECIP, B SIG, B RECIP, A ONE and B ONE are provided by a conventional microcode controller such as the microcode controller comprising program counter 12, program ROM 13 and instruction register 15 of FIG. 1.

In operation, data is coupled to multiplier/divider 30 via the X and Y data buses. Multiplexers 26 and 27 respectively choose which data bus is coupled to latch circuits 28 and 29 in response to the "AMC" and "BMC" control signals, respectively. Latch circuits 28 and 29 respectively hold the coupled data in response to control signals ALC and BLC, respectively. Logic circuit 40 forms the reciprocal or one's complement of the logarithmic number $A_L$ in response to the "A recip" control signal. Logic circuit 41, in response to the "A One" control signal, automatically forces the output thereof to be equal to a real value of one which logarithmically is represented by all zeroes. Logic circuit 42 functions to detect when an output of zero which is represented by 1/M is present and provides the AZD status signal in response thereto. Logic circuit 42 detects a zero and couples the zero detect signal AZD to the zero force logic circuit 52 so that no additional quantization error is realized by utilizing a value other than zero. Either the value of A or the one's complement of A is coupled to the "A" input of adder 50. In contrast, the B number side operates similarly with circuits 46, 47 and 48 respectively performing analogously to circuits 40, 41 and 42 described above. However, the B number side also includes sign logic circuit 45 which functions to make the B input number either positive or negative one. Typical DSP alogrithms require that a signum operation be effected in only one of the two number paths A and B although it should be readily understood that a sign logic circuit such as circuit 45 may be coupled between multiplexer circuit 26 and latch circuit 28 if necessary to perform an algorithm. Since a multiplication or divivion may be respectively effected by an addition or subtraction using logarithmic arithmetic, adder circuit 50 which selectively adds or subtracts numbers A and B is used to effect both multiplication and division in response to the multiply/divide (Mul/Div) control signal having a high or a low logic state, respectively. Adder 50 may be implemented as a conventional two's complement adder which performs either addition or subtraction of numbers A and B. Since reciprocal logic circuits 40 and 46 perform a reciprocal operation by forming a one's complement when enabled, a "1" needs to be coupled to a carry input of adder 50 to effect a two's complement and a subtraction of the reciprocaled operand. If both operands are reciprocaled, a two's complement of both operands may be formed to offset the effect of circuits 40 and 46 and allow two's complement adder 50 to perform an addition. Should an overflow or an underflow of data result from the calculation provided by adder circuit 50, detection and correction logic circuit 51 detects such a condition, corrects the condition and provides a status signal indicating an overflow/underflow condition. The status signal is coupled to condition code register 37 of FIG. 3 for other use as previously mentioned. Furthermore, if a zero is detected by either or both of circuits 42 and 48, 1/M force circuit 52 forces a real value of 1/M at the P output of circuit 52. Therefore, multiplier/divider circuit 30 eliminates additional quantization error associated with the use of the number zero in logarithmic arithmetic.

Figure 5:
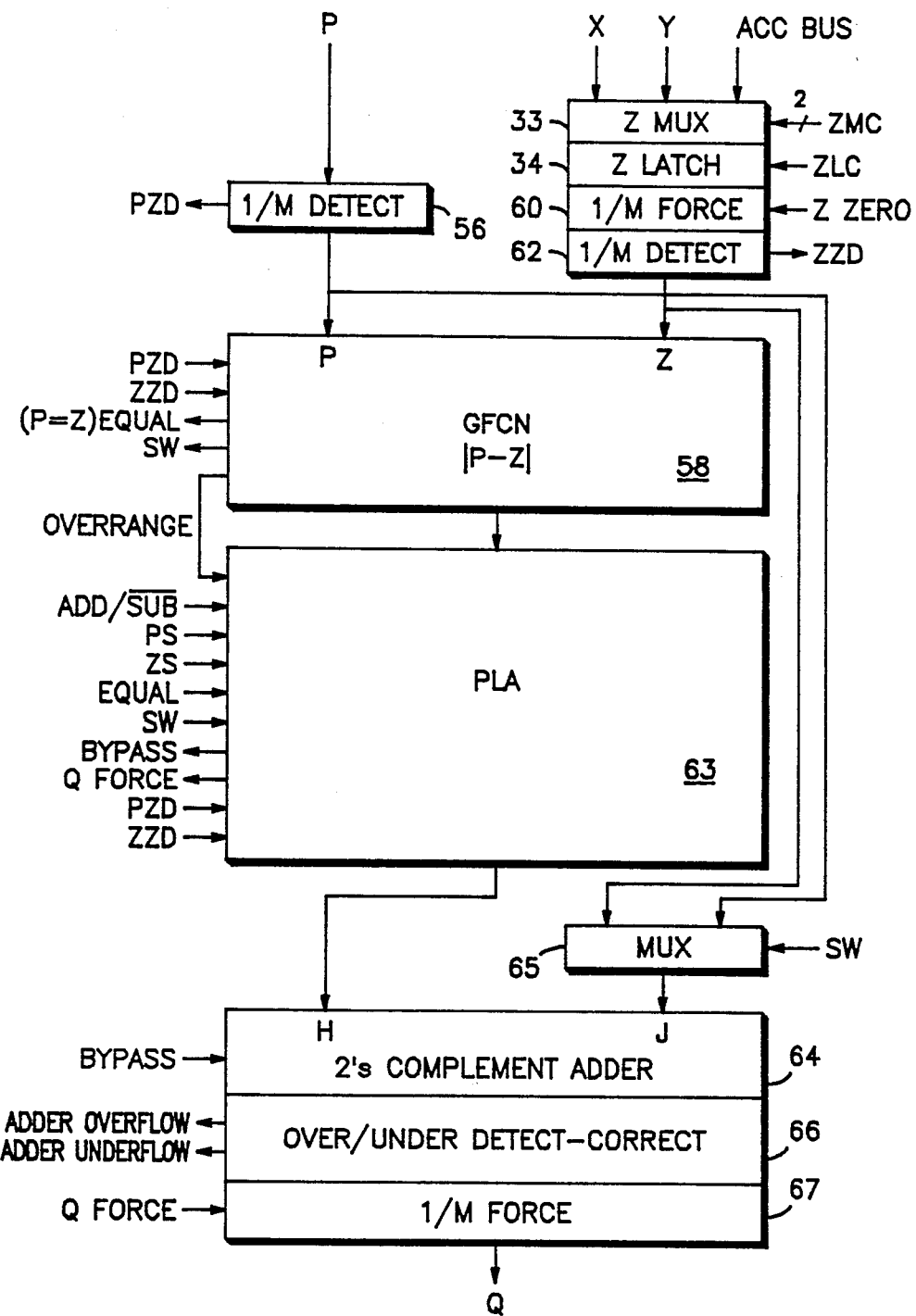
FIG. 5 illustrates in block diagram form a subtractor/adder circuit for use in the ALU of FIG. 3.

Shown in FIG. 5 is adder/subtractor circuit 32 of FIG. 3 including multiplexer circuit 33 controlled by a control signal labeled "ZMC" and latch circuit 34 controlled by a control signal labeled "ZLC". Adder/subtractor circuit 32 implements a logarithmic addition or subtraction operation. The output of multiplier/divider circuit 30 labeled "P" is coupled to an input of a zero (1/M) detect logic circuit 56 which is analogous to zero (1/M) detect logic circuits 42 and 48 of FIG. 4. Zero (1/M) detect logic circuit 56 provides a zero detect signal labeled "PZD" in response to detecting the 1/M condition and passes the output signal P to a first input of a function logic circuit 58 labeled "GFCN" for a G function which is an arbitrary labeling of the functions of computing the absolute value of the difference between P and Z. Function logic circuit 58 also provides a switch control signal labeled "SW" to be explained below. As shown by the equations derived in Appendices One and Two, a logarithmic sum and difference always comprise a term which uses the difference between the two numbers $D^{P_L-Z_L}$ and $D^{Z_L-P_L}$. An input of a zero force circuit 60 is coupled to an output of the Z latch circuit 34 to provide an output of zero in response to a zero detect signal labeled "Z Zero" coupled to a control input thereof. An output of zero force circuit 60 is coupled to an input of a zero detect circuit 62 which provides a Z zero detect signal labeled "ZZD". The Z zero detect signal is coupled to condition code register 37 for storage. An output of zero detect circuit 62 is coupled to a second input of function logic circuit 58. Function logic circuit 58 receives zero detect signals "PZD" and "ZZD" at first and second control inputs, respectively. Function logic circuit 58 also provides a "P=Z" status signal and a switch control signal labeled "SW" at first and second outputs thereof. A third output of function logic circuit 58 provides an overrange control signal which is coupled to a first input of a programmable logic array (PLA) 63. A fourth output of function logic circuit 58 provides the absolute value of the difference between P and Z and is coupled to a second input of PLA 63. An add or subtract control signal (ADD/$\overline{\text{SUB}}$), a P sign control signal (PS) and a Z sign control signal (ZS) are respectively coupled to third, fourth and fifth inputs of PLA 63. The "P=Z" status signal provided by function logic circuit 58 is coupled to a sixth input of PLA 63, and the switch control signal also provided by function logic circuit 58 is coupled to a seventh input of PLA 63. PLA 63 provides a bypass control signal at a first output and a zero force signal labeled "Q Force" at a second output. A third output of PLA 63 is coupled to a first input labeled "H" of a two's complement adder circuit 64. A multiplexer 65 has a first input coupled to the output of zero detect logic circuit 56 for receiving operand P and a second input coupled to the output of zero detect logic circuit 62 for receiving operand Z. A control input of multiplexer 65 is coupled to the switch control signal provided by PLA 63. An output of multiplexer 65 is coupled to a second input of adder circuit 64 labeled "J". The bypass control signal provided by PLA 63 is coupled to a control input of adder circuit 64. An output of adder circuit 64 is coupled to an input of an overflow/underflow detection and correction logic circuit 66. Logic circuit 66 provides an adder overflow status signal at a first output and an adder underflow status signal at a second output. A third output of logic circuit 66 is coupled to a first input of a zero force circuit 67. A second input of zero force circuit 67 receives the zero force signal "Q Force" provided by PLA 63. An output of zero force circuit 67 provides the output Q.

In operation, operands P and Z are coupled to function logic circuit 58. If either P or Z are detected as being zero by zero detect circuits 56 and 62, respectively, function logic circuit 58 in response to either of the PZD or ZZD control signals generates a switch control signal which is used by multiplexer 65 to couple the nonzero operand, if any, to the J input of adder circuit 64. Simultaneously, the switch control signal provided by function logic circuit 58 is coupled to PLA 63 which provides a bypass signal in response thereto. The bypass signal is coupled to adder 64 which causes the operand at the J input of adder 64 to be directly fed through to the Q output. When neither P nor Z are zero, the switch signal provided by function logic circuit 58 is coupled to multiplexer 65 which couples the input operand having the greatest real value to the output thereof. The output value of function logic circuit 58 is used to index a predetermined value in PLA 63 which is coupled as an input to the H input of adder circuit 64. Function logic circuit 58 forms the magnitude of the difference of operands P and Z. The function of logic circuit 58 is accomplished by first computing the values of P-Z and Z-P by using two subtractor circuits. Logic is used as described below to then couple the positive value of the two values to the output of function logic circuit 58. If the difference value is so great that the value is not indexed by PLA 63, the overrange signal causes PLA 63 to provide a predetermined output indicating this condition. If PLA 63 provides a signal "Q Force", 1/M force circuit 67 automatically outputs a minimum value as the value of Q. The output of PLA 63 which is coupled to the H input of adder 64 represents the term $\log_D(1-D^X)$ of Appendix One where X is either $P_L-Z_L$ or $Z_L-P_L$. Multiplexer 65 couples either the operand $P_L$ or $Z_L$ representing the greater real number to the J input of adder circuit 64. If an overflow or underflow of data results from the addition, correction logic circuit 66 forces a correction before the logarithmic sum is coupled as operand Q to the output of circuit 67.

Shown in FIG. 6 is a block diagram of function logic circuit 58 of FIG. 5. A logic circuit 70, comprising in part two subtractor circuits as mentioned above, is provided for calculating the difference between operands P and Z and for providing an absolute value of the operands. A first input of logic circuit 70 is coupled to operand P, and a second input of logic circuit 70 is coupled to operand Z. Logic circuit 70 also provides a first status signal labeled "Z>P" to indicate whether the magnitude of Z is greater than the magnitude of P. A second status signal labeled "equal" is provided by logic circuit 70 to indicate if the magnitudes of P and Z are equal. A third status signal labeled "Over Range" is provided by logic circuit 70 to indicate if the magnitude of the difference between P and Z is greater than the maximum number of bits being used. An output of logic circuit 70 provides the absolute value of the difference between P and Z. A function logic circuit 72 labeled "F1" provides the switch "SW" control signal at an output thereof. A first input of logic circuit 72 receives a P magnitude sign bit labeled $P_{MS}$, and a second input receives a Z magnitude sign bit labeled $Z_{MS}$ which respectively represent the sign of the two's complement numbers $P_L$ and $Z_L$. The "Over Range" status signal provided by logic circuit 70 is coupled to a third input of logic circuit 72. The first status signal (Z>P) provided by logic circuit 70 is coupled to a fourth input of logic circuit 72. The P zero detect (PZD) and Z zero detect (ZZD) status signals provided by zero detect circuits 56 and 62 of FIG. 5, respectively, are respectively coupled to fifth and sixth inputs of logic circuit 72. An output of logic circuit 72 provides the switch "SW" control signal which is coupled to multiplexer circuit 64.

In operation, both logic circuits 70 and 72 are required to implement the G function logic circuit 58. Logic circuit 70 provides the absolute value of the difference between P and Z by performing the operations $P_L - Z_L$ and $Z_L - P_L$. A logic determination is made as to whether Z is greater than P, is equal to P or whether the difference is outside the range of the number representations. Depending upon which of P and Z is greater, one of the calculated differences is outputted as the absolute value of P minus Z. Near simultaneously, logic circuit 72 provides the SW control signal which allows multiplexer 65 to switch the input operand having the greater real value. Logic circuit 72 receives the Z and P zero detect signals to determine whether either or both of Z and P are zero. Logic circuit 72 receives from logic circuit 70 the over range control signal and the Z>P control signal indicating that Z is larger than P in magnitude. Logic circuit 72 also receives sign magnitude bits $P_{MS}$ and $Z_{MS}$ which provide the sign magnitudes associated with operands P and Z. The sign magnitude bits are used to determine the operand of greater real value. Logic circuit 72 uses the sign bit magnitude to determine whether or not the switch signal will switch operand P or operand Z to adder 64.

Shown in FIG. 7(a) is a block diagram of a preferred form of PLA 63 of FIG. 5. A function logic circuit 76 labeled "F2" has a plurality of inputs for receiving a plurality of control signals. An addition or subtraction mode control signal (ADD/$\overline{SUB}$) is coupled to a first input. Sign control signals for operands P and Z labeled "PS" and "ZS", respectively, are coupled to second and third inputs thereof. The equal operand status signal labeled "Equal" provided by logic circuit 70 indicating that operands P and Z have an equal magnitude is coupled to a fourth input of logic circuit 76. Switch control signal SW provided by logic circuit 72 is coupled to a fifth input of logic circuit 76. Logic circuit 76 provides a FP/$\overline{FM}$ signal, a $Q_S$ sign signal and the minimum value Q Force signal.

In operation, logic circuit 76 generates the sign of the output signal $Q_S$. The Q force signal of logic circuit 76 also determines whether a value of 1/M will be forced onto the output. The FP/$\overline{FM}$ signal provided by logic circuit 76 determines which one of two tables (not shown) of values existing in PLA 63 is used to provide the H operand provided by PLA 63. This is implemented as can be seen from the equations in Appendices I and II by using a positive table (FP) of PLA values if a logarithmic addition operation is occuring and the signs of P and Z are the same. Otherwise, in a logarithmic addition operation a negative table of values (FM) in the PLA table is used. For example, if a logarithmic addition is signs of P and Z are not equal, the FM table is used to provide either $\log_D(1 - D(Z_L - P_L))$ or $\log_D(1 - D(Z_L - P_L))$ depending upon the relative magnitudes of $P_L$ and $Z_L$. The positive and negative tables are used in an analogous manner to provide the H operand for a logarithmic subtraction operation.

A logic circuit 77 labeled "F3" provides the bypass signal which is coupled to adder circuit 64 for bypassing the value of the H input operand. A logic circuit 78 is coupled to a first input of circuit 77 and provides a signal which is the last non-zero value. The overrange signal and P and Z zero detect signals are respectively coupled to second, third and fourth inputs of circuit 77. The absolute value of the difference between P and Z is coupled to a fifth input of logic circuit 77.

In operation, logic circuit 77 generates the bypass signal by implementing the truth table illustrated in Appendix Three. An "X" in the truth table represents an irrelevent logic state. When the bypass signal is provided by circuit 77, the value of H is bypassed in adder circuit 64 and the J input operand of adder 64 is coupled straight through to the Q output of circuit 67. The bypass signal is generated when the absolute value of the differential between the logarithmic operands P and Z is greater than the last value of H represented in the positive and negative tables of PLA 63. The last value is where PLA 63 is truncated and is a function of the base of the logarithmic number representation and the number of bits comprising the operands. Basically, when the differential between operands P and Z becomes greater than the last value indexed in PLA 63, the contribution of the H operand to the outputted Q operand is minuscule. Therefore, the H operand is bypassed totally. The number |P−Z|>Last Value is provided by logically comparing the absolute value of P−Z to a predetermined coded value which is the last non-zero index into PLA 80. The bypass signal is also provided by circuit 77 when the overrange signal is active indicating that the value of the H operand is not valid.

In operation, the bus sizing of the buses which couple operands P, X and Y to adder/subtractor circuit 32 is important because additional bits in these operands directly increase the size of processor 10 and peripheral circuitry associated therewith. In a preferred form, these buses are sixteen bits wide in which a portion of the sixteen bits represents integer bits and the remainder of bits are fractional bits. However, when adder/subtractor circuit 32 provides an output, the output may be greater than sixteen bits. Therefore, the bus which selectively couples the output of adder/subtractor circuit 32 to an input of multiplexer circuit 33 is made wide enough to contain the extra bits created by the calculation. Therefore, if repetitive calculations are effected utilizing the output as one of the two input operands, no loss of precision occurs due to inadequate bus sizing. This can be accomplished by only interfacing with external input buses having sixteen bit capacity. However, when additional bits are used, function logic circuit 58 and PLA 63 must be able to accept the increased operand bit size.

By now it should be apparent that a logarithmic arithmetic logic unit for use in a digital signal processing system has been provided. A method for adding and subtracting linear numbers in logarithmic form has been derived. A logarithmic adder/subtractor circuit which quickly and efficiently implements addition and subtraction of logarithmic operands is also provided.

Appendix I

| | |
|---|---|
| (1) | $Q' = P' + Z'$ |
| (2) | $P_L = \log_D |P'|$ |
| (3) | $|P'| = D^{P_L}$ |
| (4) | $P_s = \text{signum}(P')$ |
| (5) | $Z_L = \log_D |Z'|$ |
| (6) | $|Z'| = D^{Z_L}$ |
| (7) | $Z_s = \text{signum}(Z')$ |
| (8) | $Q_L = \log_D |Q'|$ |
| (9) | $|Q'| = D^{Q_L}$ |
| (10) | $Q_s |Q'| = P_s |P'| + Z_s |Z'|$ |
| (11) | $Q_s D^{Q_L} = P_s D^{P_L} + Z_s D^{Z_L}$ |
| | CASE 1: $P_s = Z_s$ |
| (12) | $Q_s D^{Q_L} = P_s (D^{P_L} + D^{Z_L})$ |
| (13) | $Q_s = P_s$ |

Appendix I-continued

(14) $D^{Q_L} = D^{P_L} + D^{Z_L}$
(15) $Q_L = \log_D(D^{P_L} + D^{Z_L})$
(16) if MAX $(P_L, Z_L) = P_L$,
  $Q_L = \log_D(D^{P_L}(1 + D^{Z_L-P_L}))$
(17) $Q_L = \log_D(D^{P_L}) + \log_D(1 + D^{Z_L-P_L})$
(18) $Q_L = P_L + \log_D(1 + D^{Z_L-P_L})$
(19) if MAX $(P_L, Z_L) = Z_L$
  $Q_L = \log_D(D^{Z_L} + D^{P_L})$
(20) $Q_L = \log_D(D^{Z_L}(1 + D^{P_L-Z_L}))$
(21) $Q_L = Z_L + \log_D(1 + D^{P_L-Z_L})$

CASE 2: $P_s$ is positive, $Z_s$ is negative

(22) $Q_s D^{Q_L} = P_s D^{P_L} + Z_s D^{Z_L}$
(23) $Q_s D^{Q_L} = D^{P_L} - D^{Z_L}$
(24) if MAX $(P_L, Z_L) = P_L$,
  $Q_s$ is positive
(25) $Q_L = \log_D(D^{P_L} - D^{Z_L})$
(26) $Q_L = \log_D(D^{P_L}(1 - D^{Z_L-P_L}))$
(27) $Q_L = P_L + \log_D(1 - D^{Z_L-P_L})$
(28) if MAX $(P_L, Z_L) = Z_L$,
  $Q_s$ is negative
(29) $D^{Q_L} = D^{Z_L} - D^{P_L}$
(30) $Q_L = \log_D(D^{Z_L} - D^{P_L})$
(31) $Q_L = \log_D(D^{Z_L}(1 - D^{P_L-Z_L}))$
(32) $Q_L = Z_L + \log(1 - D^{P_L-Z_L})$

CASE 3: $P_s$ is negative, $Z_s$ is positive

(33) $Q_s D^{Q_L} = P_s D^{P_L} + Z_s D^{Z_L}$
(34) $Q_s D^{Q_L} = -D^{P_L} + D^{Z_L}$
(35) if MAX $(P_L, Z_L) = P_L$,
  $Q_s$ is negative
(36) $Q_L = \log_D(D^{P_L} - D^{Z_L})$
(37) $Q_L = \log_D(D^{P_L}(1 - D^{Z_L-P_L}))$
(38) $Q_L = P_L + \log_D(1 - D^{Z_L-P_L})$
(39) if MAX $(P_L, Z_L) = Z_L$
  $Q_s$ is positive
(40) $Q_L = \log_D(-D^{P_L} + D^{Z_L})$
(41) $Q_L = \log_D(D^{Z_L} - D^{P_L})$
(42) $Q_L = \log_D(D^{Z_L}(1 - D^{P_L-Z_L}))$
(43) $Q_L = Z_L + \log_D(1 - D^{P_L-Z_L})$

CASE 4: $P_s = Z_s$ and $P_L = Z_L$

(44) $Q_s$ is arbitrary
(45) $Q_L = \dfrac{1}{M}$

Appendix II (1) $Q' = P' - Z'$
(2) $P_L = \log_D |P'|$
(3) $|P'| = D^{P_L}$
(4) $P_s = \text{signum}(P')$
(5) $Z_L = \log_D |Z'|$
(6) $|Z'| = D^{Z_L}$
(7) $Z_s = \text{signum}(Z')$
(8) $Q_L = \log_D |Q'|$
(9) $|Q'| = D^{Q_L}$
(10) $Q_s |Q'| = P_s |P'| - Z_s |Z'|$
(11) $Q_s D^{Q_L} = P_s D^{P_L} - Z_s D^{Z_L}$

CASE 1: $P_s = Z_s$

(12) $Q_s D^{Q_L} = P_s(D^{P_L} - D^{Z_L})$
(13) if MAX $(P_L, Z_L) = P_L$,
  $Q_s = P_s$
(14) $D^{Q_L} = D^{P_L} - D^{Z_L}$
(15) $Q_L = \log_D(D^{P_L} - D^{Z_L})$
(16) $Q_L = \log_D(D^{P_L}(1 - D^{Z_L-P_L}))$
(17) $Q_L = P_L + \log_D(1 - D^{Z_L-P_L})$,
(18) if MAX $(P_L, Z_L) = Z_L$,
  $Q_s = -P_s$
(19) $D^{Q_L} = -D^{P_L} + D^{Z_L}$
(20) $Q_L = \log_D(D^{Z_L}(1 - D^{P_L-Z_L}))$
(21) $Q_L = Z_L + \log_D(1 - D^{P_L-Z_L})$

CASE 2: $P_s$ is positive, $Z_s$ is negative

(22) $Q_s D^{Q_L} = D^{P_L} + D^{Z_L}$
(23) if MAX $(P_L, Z_L) = P_L$
  $Q_s$ is positive
(24) $D^{Q_L} = D^{P_L} + D^{Z_L}$
(25) $Q_L = \log_D(D^{P_L}(1 + D^{Z_L-P_L}))$
(26) $Q_L = P_L + \log_D(1 + D^{Z_L-P_L})$
(27) if MAX $(P_L, Z_L) = Z_L$,
  $Q_s$ is positive
(28) $D^{Q_L} = D^{Z_L} + D^{P_L}$
(29) $Q_L = \log_D(D^{Z_L}(1 + D^{P_L-Z_L}))$
(30) $Q_L = Z_L + \log_D(1 + D^{P_L-Z_L})$

CASE 3: $P_s$ is negative, $Z_s$ is positive

(31) $Q_s D^{Q_L} = -D^{P_L} - D^{Z_L}$
(32) $Q_s D^{Q_L} = -(D^{P_L} + D^{Z_L})$
(33) if MAX $(P_L, Z_L) = P_L$
  $Q_s$ is negative
(34) $D^{Q_L} = D^{P_L} + D^{Z_L}$
(35) $Q_L = \log_D(D^{P_L}(1 + D^{Z_L-P_L}))$
(36) $Q_L = D^{P_L} + \log_D(1 + D^{Z_L-P_L})$
(37) if MAX $(P_L, Z_L) = Z_L$
  $Q_s$ is negative
(38) $D^{Q_L} = D^{Z_L} + D^{P_L}$
(39) $Q_L = \log_D(D^{Z_L}(1 + D^{P_L-Z_L}))$
(40) $Q_L = Z_L + \log_D(1 + D^{P_L-Z_L})$

CASE 4: $P_s = Z_s$ and $P_L = Z_L$

(41) $Q_s$ is arbitrary
(42) $Q_L = \dfrac{1}{M}$

APPENDIX III

| OVER-RANGE | PZD | ZZD | $\|P - Z\| >$ LAST VALUE | BYPASS |
|---|---|---|---|---|
| 1 | X | X | X | 1 |
| 0 | 1 | X | X | 1 |
| 0 | 0 | 1 | X | 1 |
| 0 | 0 | 0 | 1 | 1 |

What is claimed is:

1. A circuit for adding or subtracting, in response to an arithmetic operation control signal, two numbers each of which has a logarithmic representation, comprising:

first zero detection means having an input for receiving a first of the two numbers, a first output for providing the first number and a second output for providing a first zero detect control signal in response to detecting that the first number is a quantized zero logarithmic number;

second zero detection means having an input for receiving a second of the two numbers, a first output for providing the second number and a second output for providing a second zero detect control signal in response to detecting that the second number is a quantized zero logarithmic number;

first means having first and second inputs respectively coupled to the first output of the first and second zero detection means, said first means providing an absolute value of a difference of said two numbers an providing a first control signal indicating which one of said two numbers has a greater real value and a second control signal indicating if both numbers have equal real values;

second means coupled to the first means for receiving the absolute value of the difference, said second means selectively providing a predetermined correction factor in response to the absolute value of the difference and providing a bypass control signal in response to the first or second zero detect control signal; and third means having a first input for selectively receiving the correction factor and a second input for selectively receiving the one of said two numbers having the greater real value in response to the first control signal, said third means selectively adding or subtracting the correction factor and said greatest real valued number to provide an output in logarithmic representation which is respectively either the sum or the difference of said two numbers, or directly outputting only the greatest real value number as the sum or difference in response to the bypass control signal, thereby avoiding a quantization error in the sum or difference output.

2. The circuit of claim 1 wherein said first means further comprise:
first logic means comprising:
  subtraction means for selectively receiving the first and second numbers, subtracting the first number from the second number to form a first difference and subtracting the second number from the first number to form a second difference and providing the one of said first and second differences having a positive value as the absolute value of the difference; and
  comparison means for selectively receiving the first and second numbers and providing first, second and third status signals in response thereto, said first status signal indicating the magnitude of the first number relative to the second number, said second status signal indicating whether the first and second numbers are equal, and said third status signal indicating whether the correction factor corresponding to the absolute value of the differential is beyond a range of predetermined correction factors outputted by the second means; and
second logic means comprising:
  first control signal generation means for receiving a predetermined bit of each of the first and second numbers, said predetermined bit representing a sign magnitude of the number, for receiving the first and third status signals and the first and second zero detect signals, said first control signal generation means providing the first control signal in response to the predetermined bits, the first and third status signals and the zero detect signals.

3. The circuit of claim 2 wherein said second means further comprise:
third logic means for providing a polarity control signal, in response to the arithmetic operation control signal, in response to the sign magnitude bits of the first and second numbers, and in response to both the second status signal and the first control signal;
storage means having a first input coupled to the absolute value of the difference and a second input coupled to the polarity control signal, for providing the correction factor in response to the polarity control signal selecting a predetermined one of two groups of correction values indexed by the storage means and in response to the difference value selecting a predetermined correction factor outputted by the indexed group; and
fourth logic means for providing the bypass control signal in response to any one of the third status signal, the first or second zero detect signal, or in response to the absolute value of the differential having a real value less than a predetermined smallest real value indexed into said storage means.

4. The circuit of claim 3 wherein the storage means is a programmable logic array.

5. The circuit of claim 1 further comprising:
first coupling means for selectively coupling an output sum or an output difference of the two numbers to a predetermined one of the inputs of the first means, for utilizing the sum or difference as one of said numbers in a subsequent arithmetic operation.

6. The circuit of claim 5 wherein said first and second numbers are coupled to the circuit via second coupling means having a bit capacity which is less than a bit capacity of the first coupling means, whereby said first, second and third means can receive numbers of variable bit size to maintain bit precision during repetitive calculations.

7. The circuit of claim 1 further comprising:
detection and correction means having an input coupled to the output of the third means, for detecting a condition resulting from either an underflow or an overflow of bits in response to the sum or difference operation of the third means and for correcting the condition to provide an output of proper bit size at an output thereof.

8. The circuit of claim 1 further comprising:
zero force logic means having an input for receiving a predetermined one of said two numbers, a control input for receiving a zero force control signal, and an output coupled to said first means, for providing a quantized zero value as said predetermined number in response to the zero force control signal.

9. The circuit of claim 1 further comprising:
multiplexing means for receiving both of the two numbers and selectively coupling the one of said two numbers having the greater real value to the third means in response to the control signal.

10. A circuit for adding or subtracting two logarithmic numbers, comprising:
first means having first and second inputs, each input selectively receiving a predetermined one of said two numbers, said first means providing an absolute value of a difference of said two numbers and providing a first control signal indicating which one of said two numbers has a greater real valu and a second control signal indicating if both numbers have equal real values;
second means coupled to the first means for receiving the absolute value of the difference, said second means selectively providing a predetermined correction factor in response to the absolute value of the difference and otherwise providing either a bypass control signal in response to one of the numbers having a quantized zero value or a zero quantization force isgnal in response to the second control signal;
third means having a first input for selectively receiving the correction factor and a second input for selectively receiving the one of said two numbers having the greater real value in response to the first control signal, said third means selectively adding or subtracting the correction factor and said greatest real valued number to provide an output in logarithmic representation which is respectively either the sum or the difference of said two numbers, or directly outputting only the greatest real value number as the sum or difference in response to the bypass control signal; and
fourth means coupled to the third means, for overriding the output of the third means in response to the zero quantization force signal and providing a predetermined quantized zero output value.

11. The circuit of claim 10 further comprising:
fifth means coupled to the first and second means for determining if either of the two logarithmic numbers has a quantized zero value and providing a quantized zero detection signal to the first and second means in response thereto.

* * * * *